United States Patent [19]

Taylor et al.

[11] Patent Number: 5,275,074

[45] Date of Patent: Jan. 4, 1994

[54] MITER SLIDER

[76] Inventors: Christopher L. Taylor, 13229 N. Cedar La., Farmers Branch, Tex. 75234; Perry G. McDaniel, 3791 Joe Wilson Rd., Midlothian, Tex. 76065

[21] Appl. No.: 935,026

[22] Filed: Aug. 25, 1992

[51] Int. Cl.⁵ .............................................. B26D 7/06
[52] U.S. Cl. ...................................... 83/437; 83/438; 403/374; 403/409.1; 403/297
[58] Field of Search ............... 83/437, 438, 468.7, 83/699; 144/216; 33/468, 469, 470, 471, 472, 473, 437, 464; 403/374, 409.1, 297

[56] References Cited

U.S. PATENT DOCUMENTS

| | | | |
|---|---|---|---|
| 503,726 | 8/1893 | Pryibil | 83/437 |
| 2,997,317 | 8/1961 | Scott | 403/297 |
| 3,484,830 | 12/1969 | Wagner et al. | 403/297 X |
| 3,865,095 | 2/1975 | Helmick | 403/374 X |
| 4,028,988 | 6/1977 | Schäfers | 403/297 X |
| 5,097,601 | 3/1992 | Pollak et al. | 83/437 X |
| 5,109,742 | 5/1992 | Strong | 83/437 X |

Primary Examiner—Frank T. Yost
Assistant Examiner—Rinaldi Rada

[57] ABSTRACT

A device for slidably positioning a power tool accessory. The geometry of the device is that of a specially modified channel with the interior opposed surfaces of the two legs of the channel being sloped like a truncated wedge. Sections of the sides of the device are partially separated from the main body so as to permit them to spring outwardly under pressure imparted by wedging members so as to cause the sprung sections to either move towards, or frictionally engage surfaces within guiding slots in a major surface of the power tool (e.g., table saw). The wedging members are controlled by conventional machine screws which permit a continuous range of adjustment.

18 Claims, 3 Drawing Sheets

MITER SLIDER

This invention relates to guiding apparatus for sliding and stationary positioning jigs and fixtures which operate on table saws and other power machining tools.

BACKGROUND OF THE INVENTION AND PRIOR ART

As is well known to those skilled in the art, certain power tools require precision guiding of work pieces therein in order to produce desired geometries, tolerances and configurations. Thus, for example, conventional power driven equipment such as table saws, router tables and the like have included at or on guiding surfaces one or more longitudinally disposed slots adapted for mated fitting with guiding members that thereby may be guided rectilinearly. In addition, in certain uses, provision must be made to lock the guiding member in a desired position within the guide slot while providing for its ready release. The geometries of the guiding members must be closely correlated with the dimensions of the slots so as to avoid binding, wobble or other tracking errors. The dimensions of such slots often conform to industry-wide standards, albeit within a broad range of tolerances. Dimensional variations within this tolerance range from manufacturer to manufacturer, and from machine to machine often result in a poor fit between a particular guide member and a given slot, thus producing unacceptable occurrences of the aforementioned tracking errors.

To accomplish the foregoing, there have previously been proposed a variety of configurations including the formation of the guiding member in an extended longitudinal geometry that fits within the guiding slots. Due to the aforementioned variations in slot dimensions, it was typically necessary to machine the guiding member to exacting tolerances in order to produce a customized fit between the guide member and a particular guide slot in an effort to reduce tracking errors. In addition to being relatively expensive to manufacture, such a custom guide member would also become one of a kind, and could not be readily transferred to another machine whose guide slots differed in geometry from those to which it had previously been fitted. In many cases, the guide member was constructed from wood, which was chosen for its low cost, widespread availability, and its relative ease of fabrication on readily available and inexpensive woodworking equipment. This, however, imposed an additional limitation brought about by the dimensional instability typical of most woods which is caused by variations in ambient temperature and humidity. Thus, under one set of atmospheric conditions, such a wooden guide member might very well fit perfectly in its intended guide slot, whereas under a different set of weather conditions it might bind or wobble excessively.

As mentioned previously, certain uses require that the guide member be disengageably locked within the guide slot for stationary applications. Since the aforementioned custom fitted guide members have no provision for such a locking action, they could not be used for these purposes. Other proposals exist to accomplish this locking operation, but they typically are usable for this purpose only, and cannot be used for those applications mentioned previously which require a close tolerance rectilinear movement of the guiding member along its associated guide slot. Additionally, some of these other proposals include levers or similar elements disposed above or below the guide member to disengageably lock the member in the guide slot. Such extensions potentially interfere with the full use of the equipment, or limit its use to a single application.

In view of the foregoing, it is apparent that there has continued to be a need for an improved positionable guiding member which singly can operate with a high degree of alignment accuracy over a wide range of guide slot geometries, while also providing the capability of being disengageably locked at any position in such guide slots. Additionally, the need continues to exist for such a guiding member which also embodies simplicity of operation, does not encroach upon equipment working surfaces, and is relatively inexpensive and simple to manufacture.

BRIEF SUMMARY OF THE INVENTION

Disadvantages of the prior art are overcome by practicing the principles of the invention hereof according to which there is provided an improved positionable sliding element (Miter Slider) having two essentially vertical sides connected by a horizontal portion, the dimensions of the sides and horizontal portion being such that the member in cross section is roughly U-shaped with an open bottom. Each of the sides includes at its lower extremity a horizontally disposed surface of sufficient width to provide adequate engaging and supporting contact with the mating bottom of the aforementioned longitudinal guide slot in the surface of the power tool.

Recessed slightly below the upper exposed horizontal surface of the horizontal portion are a pair of longitudinal rectilinear grooves or slots each being close spaced from the outer surfaces of the vertically depending sides but lying totally within the upper surface of the horizontal portion. Within these relatively shallow rectilinear slots there are formed one or more pairs of sections which penetrate entirely through the upper horizontal portion thereby providing one or more pairs of slotted spaced-apart lengths in which there is no adjacent engagement between the vertical sidewalls and the upper horizontal portion. Centrally disposed within the upper horizontal portion and extending entirely therethrough are one or more apertures, one associated with each pair of the aforementioned slots. Projecting through the apertures are disengageable threaded members which each coact with a wedging member so that when the threaded member is tightened, the associated wedge exerts side pressure on the walls of those sections of the sides that are detached from the upper portion along the side walls of the slots, thereby imparting outwardly projecting thrusts, resiliently bending outwardly such sections slightly and forcing them towards or against the mating sidewalls of the guide slot so as to either adjust the effective exterior width of the guide member relative to the interior width of the guide slot in order to achieve a close tolerance sliding fit between the guide member and the guide slot, or to temporarily lock the guide member in a fixed position within the guide slot. Conversely, when the aforementioned threaded member is loosened, side pressure exerted by the associated wedge against the sidewalls of the guide member is reduced, thereby resiliently returning the selected portions of the sidewalls of the guide member towards their initial, relaxed position. Accordingly, there are provided wedging members which are readily accessible, impart adjustment of the effective width of the guide member, or locking frictional force through selected portions of the sidewalls of the guide member against engaging surfaces of the guide slot and which do not project outside of the principal geometries of the guide member, thereby avoiding any interference with usable surface areas on the equipment.

OBJECTS AND FEATURES OF THE INVENTION

It is one general object of this invention to improve guide members for use with power equipment.

It is another object of this invention to simplify such guide members.

It is another object of the invention to provide for the adjustment of the exterior width of the guide member at selected locations along its length in order to achieve a close tolerance sliding fit between the guide member and different guide slots whose geometries may vary over a wide range of tolerances.

It is still another object of the invention to provide for controlled locking of such guide members without encroaching upon otherwise usable space.

It is yet another object of the invention to provide simplified locking of guide members in power equipment while preserving simplicity of design and low cost of manufacture.

Accordingly, in accordance with one feature of the invention, a generally rectangular member is provided having a channel-like cross section thereby providing simplicity and strength.

In accordance with another feature of the invention, the exterior sides of the vertical portions of the channel are essentially parallel and configured at right angles to the top horizontal interconnecting portion, thereby contributing to ease of manufacture and facilitating maintenance of close tolerances.

In accordance with still another feature of the invention, the interior surfaces of the aforementioned vertical portions are inclined at a slight angle with respect to the vertical whereby the space between opposite surfaces is greater at the bottom and decreases progressively and linearly with distance upwardly therefrom, thereby providing wedging surfaces in a simple and easy to manufacture configuration.

In accordance with still another feature of the invention, a pair of threaded fastening members are countersunk within the upper horizontal surfaces of the guide member and are provided in threaded engagement with a pair of truncated wedge elements, each positioned substantially central to a corresponding pair of slotted expandable portions of the guide member thus facilitating the tightening of the countersunk threaded fastening members to produce vertical travel of the associated truncated wedging elements and correspondingly imparting lateral thrusts to unattached portions of the vertical side walls to force them into either a close tolerance sliding fit, or a locking engagement with mating surfaces in positioning slots within associated power equipment.

In accordance with yet another feature of the invention, a load-bearing washer is strategically located in proximity to the truncated wedge elements to accept the thrust developed by the wedge elements, thus preventing undesired bowing of the horizontal sections of the guide member and correspondingly extending the range of adjustment of exterior width.

These and other objects and features of the invention will be apparent from the following detailed description of a preferred embodiment, by way of example, with reference to the drawing.

DETAILED DESCRIPTION OF THE INVENTION

Figure 1:
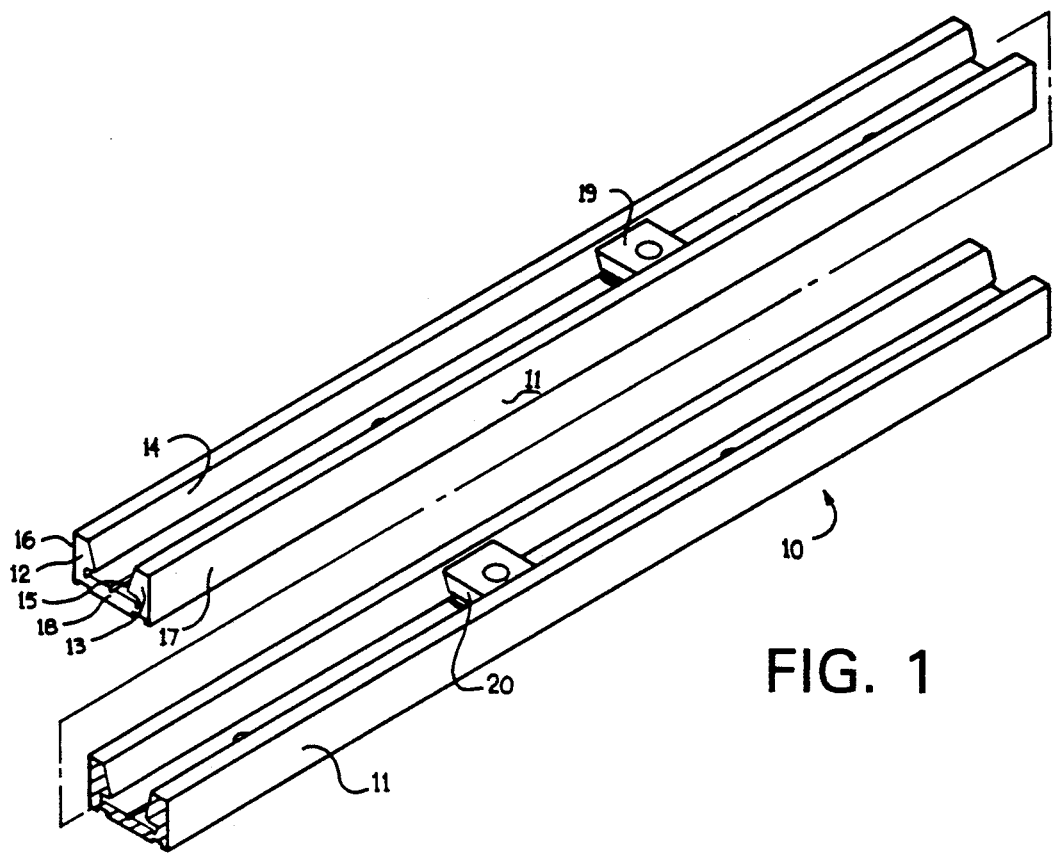
FIG. 1 is a bottom perspective view of the Miter Slider in accordance with the invention hereof.

Now turning to the drawing and more particularly to FIG. 1 thereof, it will be observed that it depicts in perspective a Miter Slider assembly 10 in accordance with the principles of the invention. To assist in clarity of description, the slider assembly is shown inverted, or upside down. The Miter Slider assembly comprises slider bar frame 11 having a modified U-shaped cross section as will be described hereinafter. The sides of the "U" are mirror image sections 12 and 13 having complementary interior sloping surfaces 14 and 15 and non-sloping exterior parallel surfaces 16 and 17.

Figure 4:
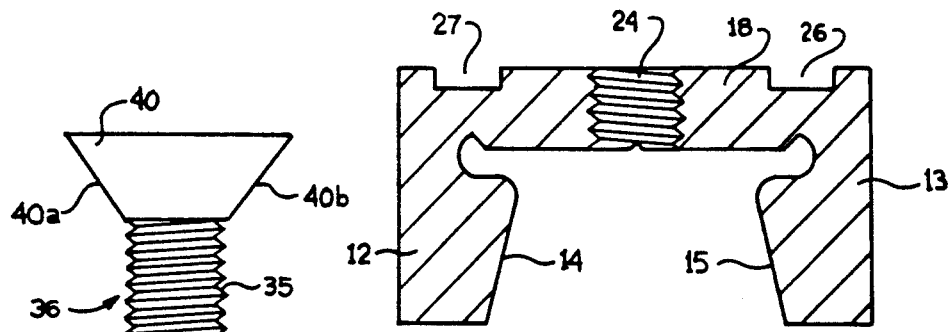
FIG. 4 is a sectional view taken along the section lines 4—4 of FIG. 3.

Connecting mirror image sections 12 and 13 is lateral section 18 which is constructed integrally with sections 12 and 13 so as to form a modified U in cross section. Reference to FIG. 4 shows the cross sectional geometry of the principal portions of the Miter Slider bar frame 11 in greater detail.

Figure 5:
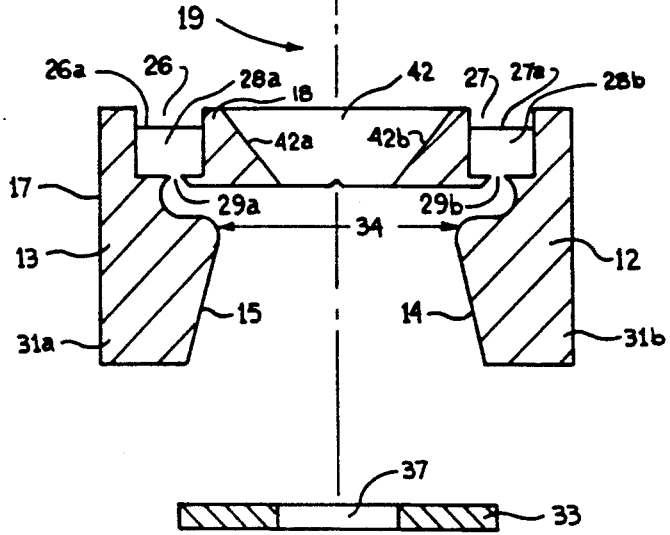
FIG. 5 is an exploded sectional view taken along the section lines 5—5 of FIG. 3.
Figure 6:
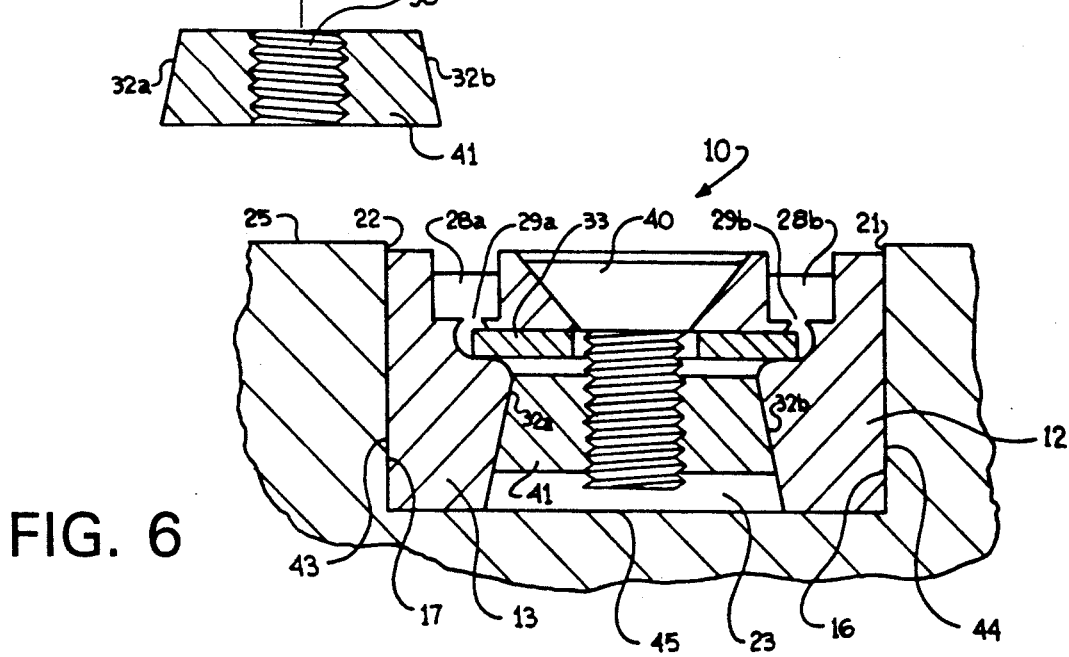
FIG. 6 is a partially broken away unexploded sectional view similar to the exploded sectional view of FIG. 5 except depicting the Miter Slider positioned within a typical power tool guiding slot.

Referring again to FIG. 1, two identical expansion mechanism assemblies 19 and 20 will be observed, and both are illustrated by the assembly shown in FIGS. 5 and 6. As will be observed from the following description, each of the two expansion mechanism assemblies 19 and 20 coact in cooperation with interior complementary sloping surfaces 14 and 15 so as to slightly spread apart the portions of mirror image sections 12 and 13 that are immediately adjacent thereto so as to expand them towards, or into contact with adjacent wall surfaces 21 and 22 of mating longitudinal slot 23 (FIG. 6) within the surface 25 of a power tool such as a table saw.

Within lateral section 18 there are deposed a plurality of threaded apertures 24a-24d which are provided for the convenience of the user of the Miter Slider so that accessories can be attached thereto. Thus, for example, a jig or fixture may be conveniently fastened to the Miter Slider by one or more machine screws or the like having threads corresponding to the threads provided within threaded apertures 24a-24d. The section 4—4 of FIG. 3, which is shown in detail in FIG. 4, depicts threaded aperture 24a and, since the section 4—4 is representative also of sections taken through apertures 24b, 24c, and 24d, the threaded aperture in FIG. 4 is identified with the number 24 without suffix letters.

Figure 2:
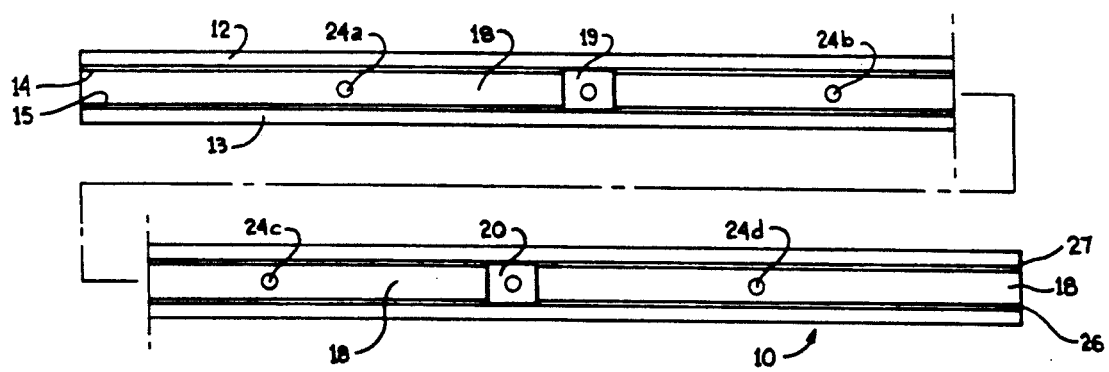
FIG. 2 is a bottom plan view of the Miter Slider of FIG. 1.
Figure 3:
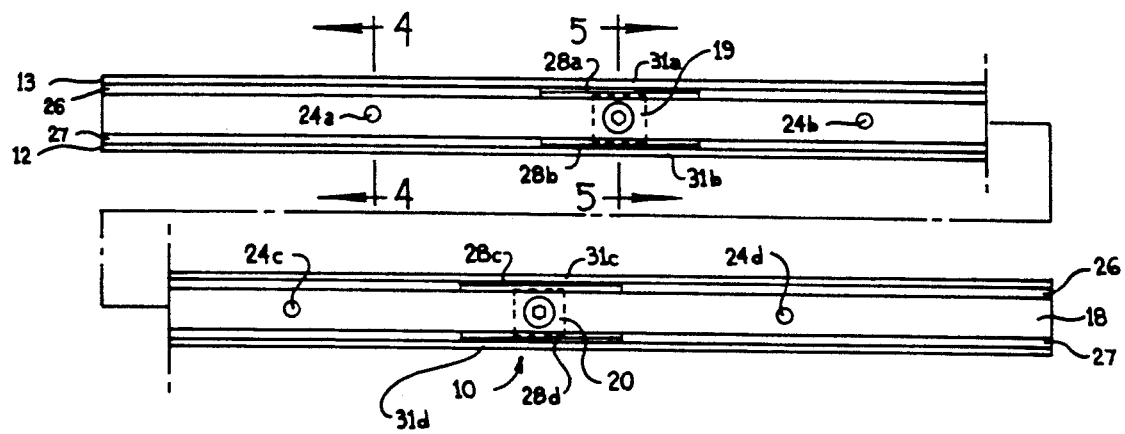
FIG. 3 is a top plan view of the Miter Slider.

While still referring to FIG. 4, attention is directed to two shallow grooves 26 and 27 which extend the entire length of the lateral section 18 of slider bar frame 11 as shown in FIGS. 2 and 3. However, as is mentioned above and as will be described in greater detail below, there are disposed within shallow grooves 26 and 27 dished out regions 28a-28d (FIGS. 3, 5, and 6). As will be observed from reference to FIG. 3, there are two pairs of such dished out regions which are designated as 28a-28b and 28c-28d. These pairs are associated respectively with expansion mechanism assembly 19 and expansion mechanism assembly 20 and extend in both directions longitudinally from the center lines of expansion mechanism assemblies 19 and 20 essentially symmetrically thereabout.

The dished out regions 28a-28d (FIGS. 5 and 6) extend downwardly beyond the bottom surfaces 26a and 27a of shallow grooves 26 and 27 for a distance sufficient to produce narrow slits 29a and 29b. Identical geometries also exist in dished out regions 28c and 28d which are immediately adjacent expansion mechanism assembly 20 (FIG. 3). The purpose of slits 29a-29b (and the corresponding slits adjacent expansion mechanism assembly 20) is to detach predetermined longitudinal lengths 31a-31d of mirror image sections 12 and 13 from immediately adjacent portions of lateral section 18, thereby contributing to the ease with which such limited longitudinal lengths 31a-31d are capable of being bowed outwardly under the wedging influence of expansion mechanism assemblies 19 and 20.

Further reference to FIG. 5 reveals details of expansion mechanism assembly 19 which also is representative of expansion mechanism assembly 20. There, it will be observed that the mechanism comprises screw 36 having a threaded shank 35 and conventional head 40. Head 40 includes surfaces 40a and 40b which are parts of the same circular truncated cone which is conventional for screws of this type and which are adapted for mating engagement with corresponding surfaces 42a-42b of truncated conical recess 42 in lateral section 18. Also included is washer 33 which is seen to include a conventional aperture 37 through which the threaded portion 35 of screw 36 projects when entering into mating engagement with engaging threads 38 of truncated wedge member 41. Washer 33 is shown in its operating position in figure 6. Since its outer diameter is greater than dimension 34 (FIG. 5) it is slid into its operating position from the end of slider bar frame 11.

Washer 33, in combination with the geometries of the adjacent surfaces within slider bar frame 11, contributes importantly to the effectiveness of the expansion mechanism assembly 19. Thus, as will be observed from reference to FIG. 6, when screw 36 is turned so as to draw truncated wedge member 41 upwardly, the vertical thrust that otherwise would cause that portion of lateral section 18 to bow downwardly is prevented from causing such bowing by the presence of washer 33.

Were it not for the presence of washer 33, there would be a point in the operation of the expansion mechanism assembly 19 at which expansion of sidewalls 31a-31d (FIG. 3) would cease because section 18 would bow downwardly, preventing wedge 41 from further vertical movement. At such a point, expansion of sidewalls 31a-31d would cease, being replaced by downward bowing of section 18. This would unduly limit the range of the expansion mechanism. Accordingly, through the presence of washer 33, significant downward bowing of section 18 is prevented and the range of operable adjustment is substantially increased.

FIG. 6 depicts the Miter Slider assembly 10 in position within a slot formed in the surface 25 of a typical power tool. The slot 23 is bounded by wall surfaces 21 and 22 together with bottom surface 45. There, it will be observed, is shown a section including an expansion mechanism assembly similar to assembly 19 or 20. Such assembly, however, has been operated by turning screw 36 so as to raise truncated wedge member 41 such that surfaces 32a-32d impart lateral thrust to mirror image sections 12 and 13 thereby resiliently bowing them outwardly so that surfaces 16 and 17 are thrust outwardly to either move towards, or tightly engage the lower portions of corresponding surfaces 43 and 44 as shown.

In FIG. 6, surfaces 16 and 21 on the one hand and 17 and 22 on the other hand are parallel and contiguous so as to show the slider in its expanded condition in which it fills mating longitudinal slot 23. However, it should be understood that when the slider is in its unexpanded condition, some clearance can be expected between exterior walls 16 and 17 and the adjacent interior walls 43 and 44 of mating longitudinal slot 23.

When it is desired to either decrease the effective width of, or unlock the Miter Slider, screw 36 is turned correspondingly so as to cause truncated wedge member 41 to move downwardly, thereby relieving the lateral thrust imparted by its above-described sloping surfaces, whereupon the natural springiness of the materials of the Miter Slider results in the return to the normal position of those limited lengths of partially disengaged material adjacent to the expansion mechanism assemblies, thereby reducing the effective width of the Miter Slider.

It will now be evident that there has been described herein a Miter Slider which is relatively simple in design and manufacture and yet embodies the advantageous features heretofore mentioned. Although the invention hereof has been described by way of example of a preferred embodiment, it will be evident that other adaptations and modifications may be employed without departing from the spirit and scope thereof. For example, additional locking regions could be employed similar to those comprising expansion mechanisms assemblies 19 and 20 and the adjacent geometrical configurations. In addition, in adaptations wherein Miter Slider assembly is relatively short in length, a single expansion mechanism assembly could be employed.

The terms and expressions employed herein have been used as terms of description and not of limitation; and thus, there is no intent of excluding equivalents, but on the contrary it is intended to cover any and all equivalents, adaptations and modifications that may be employed without departing from the spirit and scope of the invention.

What is claimed is:

1. A guiding member usable with power tool having a working surface with a guide slot therein for receiving the guiding member, comprising in combination:
   a. an elongated member having a linear longitudinal axis, two essentially vertical sides, a horizontal section, having inner and outer surfaces, extending between said essentially vertical sides; said member including
      i. first elongated aperture in the outer surface of said horizontal section and parallel to said linear longitudinal axis, said first aperture being disposed adjacent one of said vertical sides and parallel thereto, said longitudinal aperture extending entirely through said horizontal section thereby separating a predetermined portion of said one of said vertical sides along said first elongated aperture from said horizontal section;

ii. a recess within said outer surface of said horizontal section and spaced apart from said first elongated aperture by a predetermined distance, said recess being essentially centrally positioned with respect to said first elongated aperture;
iii. an adjustment screw mounted within said recess; and
b. width adjustment means responsive to adjustment of said adjustment screw for imparting horizontal force to said predetermined portion of said one of said vertical sides along said first elongated aperture thereby to expand said predetermined portion outwardly.

2. A guiding member according to claim 1 in which said recess is located essentially midway between said vertical sides.

3. A guiding member according to claim 1 in which said adjustment means includes a movable wedge.

4. A guiding member according to claim 3 in which said movable wedge is truncated.

5. A guiding member according to claim 1 further including:
a. a second elongated aperture in said outer surface of said horizontal section, said second elongated aperture being spaced from said first elongated aperture along the axis of said first elongated aperture and being in alignment therewith, thereby separating a second portion of said one of said vertical sides along said second elongated aperture from said horizontal section;
b. a second recess within said outer surface of said horizontal section, said second recess being essentially centrally positioned with respect to said second elongated aperture;
c. a second adjustment screw mounted within said second recess; and
d. second adjustment means responsive to adjustment of said second adjustment screw for imparting horizontal force to said second portion of said one of said vertical sides thereby to expand said second portion outwardly.

6. A guiding member according to claim 6 in which said recesses are spaced apart from said elongated apertures by a predetermined distance.

7. A guiding member according to claim 6 in which said recesses are located essentially midway between said vertical sides.

8. A guiding member according to claim 6 in which said adjustment means each include a movable wedge.

9. A guiding member according to claim 6 in which said movable wedge is truncated.

10. A guiding member according to claim 1 in which said width adjustment means includes a stress relief washer for preventing bowing of said horizontal section.

11. A guiding member comprising in combination:
a. an elongated member having a linear longitudinal axis, two essentially vertical sides, a horizontal section, having an outer surface, extending between said essentially vertical sides; said member including
i. a longitudinal groove in the outer surface of said horizontal section and parallel to said linear axis, said groove being disposed adjacent one of said vertical sides and parallel thereto, said longitudinal groove including a limited portion comprising an elongated aperture extending entirely through said horizontal section thereby separating the portion of said one of said vertical sides along said elongated aperture from said horizontal section;
ii. a recess within said outer surface of said horizontal section and spaced apart from said first elongated aperture by a predetermined distance, said recess being essentially centrally positioned with respect to said elongated aperture;
iii. an adjustment screw mounted within said recesses; and
b. width adjustment means responsive to adjustment of said adjustment screw for imparting horizontal force to a portion of said one of said vertical sides along said elongated aperture thereby to expand said portion outwardly.

12. A guiding member according to claim 11 in which said width adjustment means includes a movable wedge.

13. A guiding member according to claim 12 in which said movable wedge is truncated.

14. A guiding member according to claim 11 further including:
a. a second longitudinal groove in the outer surface of said horizontal section and parallel to said first longitudinal groove, said second longitudinal groove being disposed adjacent the other of said vertical sides and parallel thereto, said second longitudinal groove including a second limited portion comprising a second elongated aperture extending entirely through said horizontal section thereby separating the portion of said other of said vertical sides along said second elongated aperture from said horizontal section.

15. A guiding member according to claim 14 in which said recess is located essentially midway between said vertical sides.

16. A guiding member according to claim 11 in which said width adjustment means includes a stress relief washer for preventing bowing of said horizontal section.

17. A guiding member comprising a combination:
a. an elongated substantially channel-shaped member having a linear longitudinal axis, two essentially vertical sides each having an essentially horizontal bottom extremity, a horizontal top extending between said essentially vertical sides thereby together with said vertical sides forming said channel-shaped member, each of said sides having interior sloping walls such that the distance between corresponding surface regions of said interior sloping walls is greater near the essentially horizontal bottom extremities of said sides and decreasing linearly as a function of the vertical distance above said essentially horizontal bottom extremities, thereby forming geometries adapted for receiving truncated wedges; said channel-shaped member including
i. a pair of longitudinal grooves in the top surface of said horizontal top and parallel to said linear longitudinal axis, one of said grooves being disposed adjacent one of said vertical sides and parallel thereto, and the other of said grooves being disposed adjacent the other of said vertical sides and parallel thereto; each of said longitudinal grooves including a pair of spaced apart and limited portions comprising elongated apertures extending entirely through said horizontal top thereby separating predetermined portions only of said vertical sides from said horizontal top along said elongated apertures, a first of the elongated apertures of one of said limited portions being disposed in juxtaposed relationship with a corresponding one of the elongated apertures of the other of said limited portions, and a second of the elongated apertures of one of said limited portions being disposed in a juxtaposed relationship with the another of the elongated apertures of another of said limited portions;

ii. a pair of recesses within said top surface of said horizontal top, a first of said pair of recesses being essentially centrally and symmetrically positioned between a first of said elongated apertures and said corresponding one of said elongated apertures and a second of said pair of recesses being essentially centrally and symmetrically positioned between said second of said elongated apertures of said one of said limited portions and said other of said elongated apertures;

iii. adjustment screws, one of said adjustment screws being mounted within said one of said recesses, and the other of said adjustment screws being mounted within said other of said recesses;

b. a first truncated wedge and a second truncated wedge, each of said wedges having opposed sloping walls to form said truncated wedge, each of said wedges having an upper truncated surface, each of said upper truncated surfaces having a threaded recess extending thereinto essentially at right angles to siad upper truncasted surface, said threaded recess of said one of said wedges being adapted for receiving one of said adjustment screws and said threaded recess of said other of said wedges being adapted for receiving the other of said adjustment screws;

whereby, when said guiding member is in position within a mating channel and said adjustment screws are turned to draw said truncated wedges upwardly within said channel-shaped member, portions of said vertical sides adjacent to said elongated apertures are expanded outwardly, and are in frictional engagement with adjacent surfaces of said mating channel to temporarily lock said guiding member into position.

18. A guiding member according to claim 17 further including first and second stress relief washers operatively associated respectively with said first and said second truncated wedges for preventing bowing of said horizontal top of said elongated channel-shaped member.

* * * * *